US011954177B2

(12) United States Patent
Singla et al.

(10) Patent No.: US 11,954,177 B2
(45) Date of Patent: Apr. 9, 2024

(54) SYSTEM AND METHOD FOR ONLINE CONSTRAINT OPTIMIZATION IN TELECOMMUNICATIONS NETWORKS

(71) Applicant: Verizon Patent and Licensing Inc., Basking Ridge, NJ (US)

(72) Inventors: Kushal Singla, Bangalore (IN); Sidakpreet Singh Chawla, Jalandhar (IN); Ebenezer Bardhan, Chennai (IN); Pooja Khivesara, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 808 days.

(21) Appl. No.: 17/101,258

(22) Filed: Nov. 23, 2020

(65) Prior Publication Data
US 2022/0164593 A1 May 26, 2022

(51) Int. Cl.
*H04L 12/725* (2013.01)
*G06F 18/20* (2023.01)
*G06F 18/2431* (2023.01)

(52) U.S. Cl.
CPC ........ *G06F 18/2431* (2023.01); *G06F 18/285* (2023.01)

(58) Field of Classification Search
CPC ... G06F 18/2431; G06F 18/285; H04L 47/83; H04L 45/24; H04L 47/823; H04W 28/0268
See application file for complete search history.

(56) References Cited

U.S. PATENT DOCUMENTS

2021/0075717 A1* 3/2021 Irizarry ................. H04L 47/24

* cited by examiner

*Primary Examiner* — Hassan Mrabi

(57) ABSTRACT

Systems and methods described herein provide an online constraint optimizing service that evaluates user requests and inquiries for telecommunications services in the context of a real-time constraint-based analysis. According to an implementation, a network device receives a function for an analytic event and a constraint. The function applies different user attributes for a telecommunications network. The network device generates a training data set using offline constrained optimization of the function. The network device develops a predictive model for utilization of network resources in the telecommunications network using the training data set. The network device receives a user request that corresponds to the analytic event addressed by the predictive model and conducts an online prescriptive analysis using the predictive model. The network device optimizes allocation of the network resources to the user based on the prescriptive analysis. The network device monitors the model recommendations and adapts the predictive model for concept drift while maintaining the constraint.

20 Claims, 6 Drawing Sheets

SYSTEM AND METHOD FOR ONLINE CONSTRAINT OPTIMIZATION IN TELECOMMUNICATIONS NETWORKS

BACKGROUND INFORMATION

In order to satisfy the needs and demands of users of mobile communication devices, providers of wireless communication services continue to improve and expand available services as well as networks used to deliver such services. However, limited infrastructure and other factors may place limitations on the availability of some products and services to customers.

Organizations providing telecommunications services can offer customer support in a variety of different ways, such as interactive communications with a customer support representative (CSR). Typically, interactive customer contact may be established when a customer contacts a call center via a voice telephone call (e.g., mobile, landline, etc.). However, a service representative may be contacted in other ways to obtain interactive customer support, which may include instant messaging, customer portals, text messaging, video teleconference and/or voice teleconferencing over a mobile device and/or computer.

DETAILED DESCRIPTION OF PREFERRED EMBODIMENTS

Figure 1:
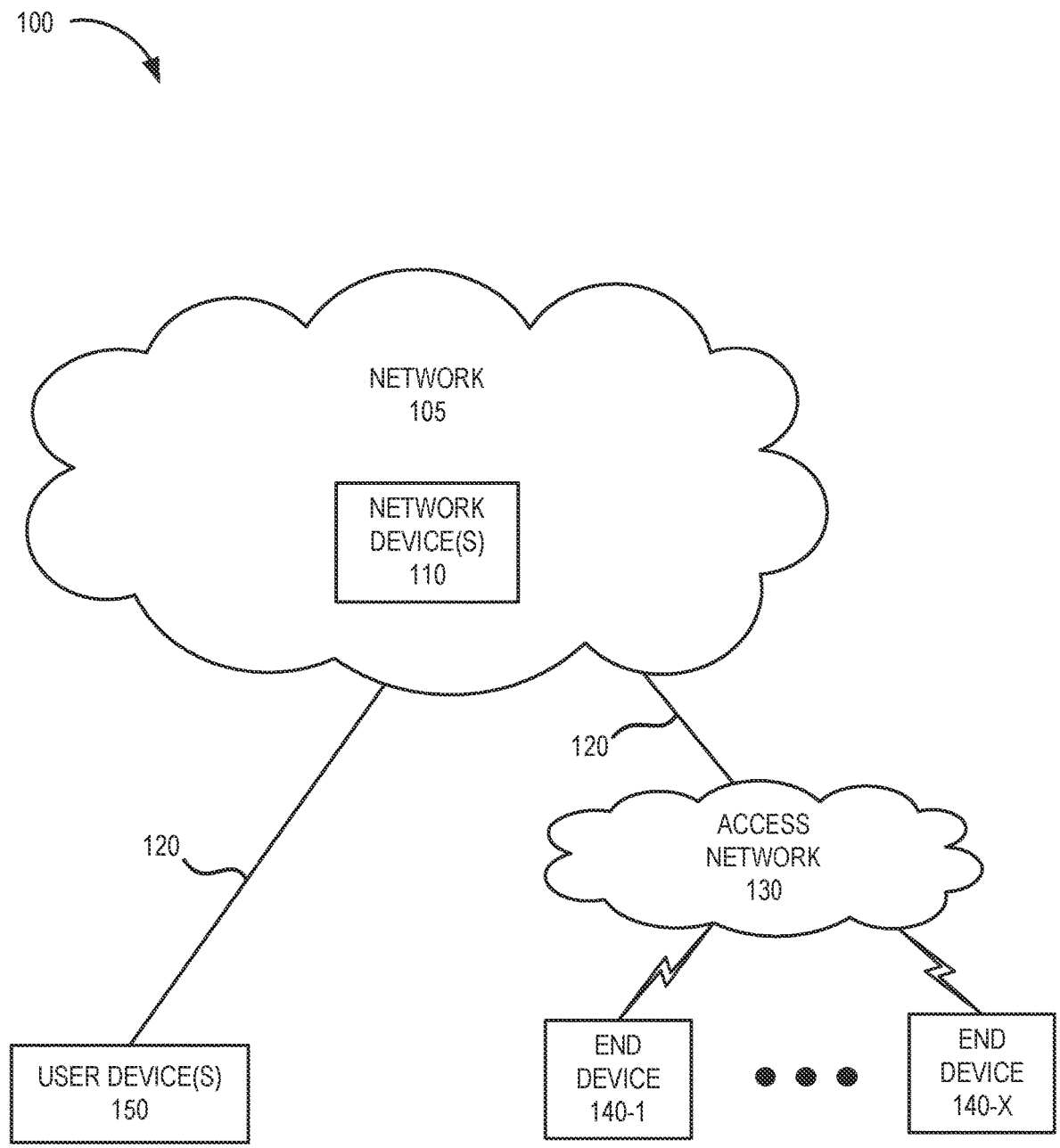
FIG. 1 is a diagram illustrating an environment according to an implementation described herein.

The following detailed description refers to the accompanying drawings. The same reference numbers in different drawings identify the same or similar elements.

Telecommunications service providers may address customer inquiries through real-time decisions, which may be managed through an interactive session with a customer service representative (such as a voice call or chat session). When a customer initiates a request or complaint, some options for resolution, such as fee waivers, service adjustments, and discounts, may require that a customer service representative seek approval prior to offering a solution to a customer (a waiver, for example), since allocation of constrained resources may affect decisions for other customers. This approval process may slow down the interactive session, causing additional customer aggravation and reducing efficiency of the customer service representative. Alternatively, a customer service representative may be pre-approved to offer waivers or other solutions for certain conditions. These pre-approvals can significantly shorten the time of an interactive session with the customer. However, the thresholds and/or criteria for such pre-approvals may not be adapted to reflect current trends in the network or optimize network constraints. Furthermore, the network may not be properly utilized based on customers' particular resource usage. Thus, there is a need for a system to provide real-time analytics to resolve customer service inquiries and to improve network utilization based on customized customer offers.

According to implementations described herein, resolution of some customer requests and inquiries for telecommunications services may be evaluated in the context of a real-time constraint-based analysis by optimizing for network utilization. For example, the systems and methods described herein may provide an online constraint optimizing service that uses historical network data and machine learning algorithms, which are combined with business rules, such as a business constraint. A business constraint may be, for example, that a happiness or satisfaction quotient of customers should not fall below a certain level for a particular service. Considering this kind of constraint, or some other constraint that is deemed appropriate, the online constraint optimizing service may determine the optimal amount of network resources/services that should be given/allocated to a customer based on historical data for the customer. Determination of the optimal amount of resource/service may produce a model which the online constraint optimizing service can use to predict responses to future requests. Whenever there is a new customer or an existing customer asks for a new resource/discount, the online constraint optimizing service can give an optimal decision at that point in time without the risk of leaving an unacceptable margin of available resources for subsequent requests.

Thus, systems and methods described herein are able to allocate network resources under business constraints in an online fashion (e.g., in a real-time fashion) as the user asks for that resource. In contrast with a reactive approach that may adjust responses based on a level of available resources, systems and methods described herein leverage predictive models to make an optimal decision to allocate network resources at the time of a request.

FIG. 1 is a diagram of an exemplary environment 100 in which the systems and/or methods, described herein, may be implemented. As illustrated, environment 100 includes a network 105, network devices 110, and one or more user devices 150. Environment 100 includes a link 120 between network 105 and user device 150. As further illustrated, for description purposes, environment 100 may further include an access network 130 and end devices 140-1 through 140-X (also referred to as end devices 140, or individually or generally as end device 140).

Network 105 includes one or multiple networks of one or multiple types. For example, network 105 may be implemented to include an optical network, the Internet, a mobile network, a wired network, a local area network (LAN), a service provider network, a network provider network, a private Internet Protocol (IP) network, an application layer network, a cloud network, a virtual network, and/or another type of network. In another implementation, network 105 may be implemented to include an access network (e.g., a radio access network (RAN), a WiMax network, a Wi-Fi network, etc.) and a core network.

Network device 110 may include a device that has computational and communicative capabilities. According to some exemplary implementations, a network device 110 may be included in an operations support system (OSS), a business support system (BSS), or another type of support system. According to an exemplary embodiment, network device 110 includes logic, in whole or in part, that provides the online constraint optimizing service, as described herein. According to an exemplary embodiment, network device 110 may store, manage, and/or have access to information that supports the online constraint optimizing service, as described further herein.

According to another implementation, network device 110 may also include one or more core network functions, such as user plane function (UPF), a non-3GPP interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

Link 120 may include one or multiple communication links via which end devices 140, user devices 150, and network devices 110 may communicate with each other. For example, link 120 may include a wireless link, a wired link, and/or an optical link.

Access network 130 may be implemented to include various architectures associated with wireless services, such as, for example, macrocell, microcell, femtocell, picocell, metrocell, NR cell, LTE cell, non-cell, or another type of cell architecture. Additionally, according to various exemplary embodiments, access network 110 may be implemented according to various wireless technologies (e.g., radio access types, etc.), wireless standards, wireless frequencies/bands/carriers, licensed radio spectrum, unlicensed radio spectrum, and/or other attributes of radio communication.

End device 140 may include a device that has computational and wireless communicative capabilities. Depending on the implementation, end device 140 may be a mobile device, a portable device, a stationary device, a device operated by a user (e.g., user equipment (UE), etc.), or a device not operated by a user (e.g., an Internet of Things (IoT) device, etc.). For example, end device 140 may be implemented as a smartphone, a mobile phone, a personal digital assistant, a tablet, a netbook, a wearable device (e.g., a watch, glasses, etc.), a computer, a device in a vehicle, a gaming device, a music device, an IoT device, or other type of wireless device. End device 140 may be configured to execute various types of software (e.g., applications, programs, etc.). The number and the types of software may vary among end devices 140.

User device 150 may include a device that has computational and communicative capabilities. User device 150 may be implemented as a computer, a terminal device, or another suitable end user device. According to an exemplary embodiment, user device 150 includes logic, in whole or in part, that provides access to the online constraint optimizing service. For example, user device 150 may include software that performs an operation or a process of the online constraint optimizing service. The software may include graphical user interfaces that provide an interactive environment for a user (e.g., a customer support representative, not illustrated) in support of the online constraint optimizing service. User device 150 may include software that permits user device 150 to query and/or retrieve information stored by or accessible to network device 110, as described herein. User device 150 may include software for a customer service center, and/or other tools that may support the online constraint optimizing service, as described herein.

A network device, such as network device 110, may be implemented according to a centralized computing architecture, a distributed computing architecture, or a cloud computing architecture (e.g., an elastic cloud, a private cloud, a public cloud, etc.). Additionally, user device 150 and/or network device 110 may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, according to other embodiments, environment 100 may not include user device 150 or network 105, network device 110, and link 120.

Figure 2:
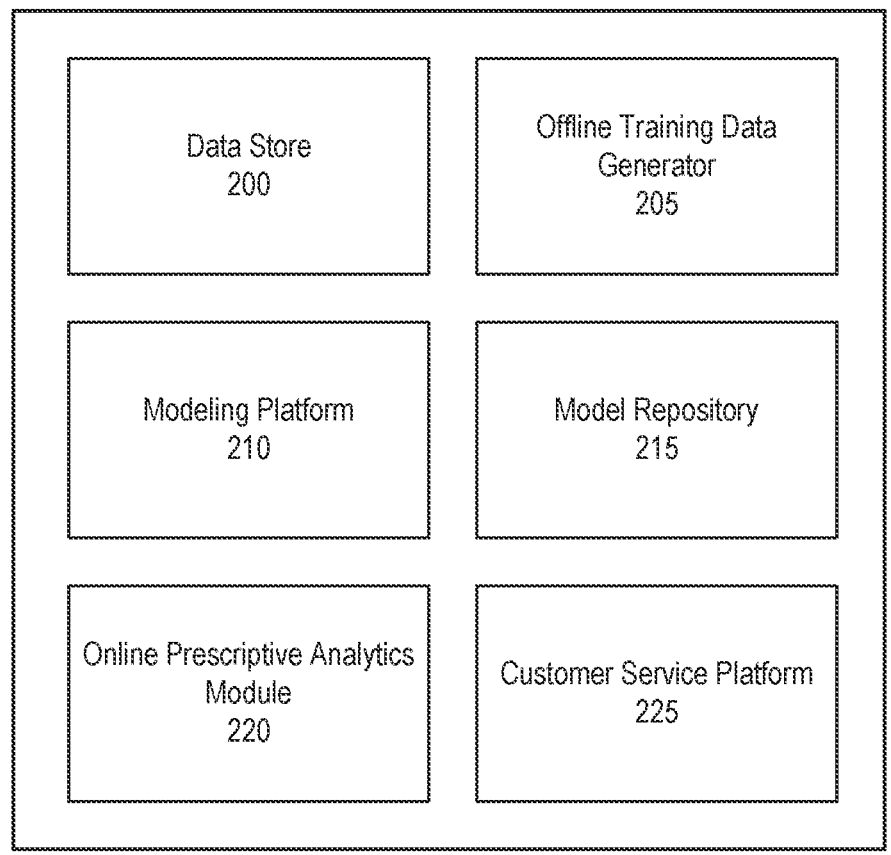
FIG. 2 is a diagram illustrating exemplary logical components of the core network of FIG. 1 according to an implementation described herein.

FIG. 2 is a diagram illustrating logical components of network 105. The logical components of network 105 may be implemented, for example, through one or more network devices 110. As shown in FIG. 2, network 105 may include a data store 200, an offline training data generator 205, a modeling platform 210, a model repository 215, an online prescriptive analytics module 220, and a customer service platform 225.

Data store 200 may include a centralized or distributed data store shared among network devices 110 and used by modeling platform 210 for modeling and analysis. According to an embodiment, the information in data store 200 may include customer information. For example, the customer information may include customer-provided information from a customer profile, such as age, gender, etc. Customer information may additionally include computed/collected data, such as customer preferences, customer satisfaction scores, longevity, churn rates, etc. According to an exemplary implementation, the customer information may also include information pertaining to locations where end devices 140 and/or user devices 150 associated with a customer may be situated in a geographic area. According to another embodiment, the customer information may also include other demographic data based on device usage, transactional data, etc. According to an implementation, customer data may include anonymized data to protect consumer privacy. For example, network devices 110 may extract, anonymize, and/or aggregate customer data for use in generating predictive models described further herein.

According to an exemplary embodiment, information in data store 200 that supports the online constraint optimizing service may include network information. The network information may include constrained capacities of network resources (e.g., such as available bandwidths, a number of concurrent connections supported, processing capacities, supported frequencies and RATs, etc.) and network utilization data. For example, various system tools and/or network servers (not illustrated), such as TrueCall® and/or other monitoring and/or analytics systems that may obtain network information pertaining to network traffic (e.g., uplink and/or downlink traffic) associated with access network 130 and end devices 140. The network information may include end device records that may indicate traffic or session data and performance data (e.g., Key Performance Indicators (KPIs), network performance metrics that correlate to Quality of Experience (QoE), Mean Opinion Score (MOS), Quality of Service (QoS) values, etc.) associated with end devices 140. For example, the performance data may indicate values relating to the performance associated with user sessions, connections, channels, messaging (e.g., protocol level, etc.), bit rates, packet error loss rates, and other performance indicators (e.g., throughputs, etc.) of the wireless service in relation to RAN devices and/or access network 130. The end device records may include geographic information (e.g., latitude/longitude values, location values, etc.) pertaining to end devices 140 and the size of the communications (e.g., bytes, Kilobytes, Megabytes, Gigabytes, etc.) associated with the user sessions.

According to various exemplary embodiments, the network information may pertain to a single RAN device, multiple RAN devices (e.g., a subset of all RAN devices), or all RAN devices of access network 130. Additionally, or alternatively, the network information may pertain to RAN devices associated with other types of criteria, such as carrier (e.g., carrier frequency, sector of a cell, etc.), type of radio access technology (RAT), geographic location of RAN device, time period (e.g., day, day and time, etc.), type of RAN device (e.g., evolved Node B (eNB), next generation Node B (gNB), and/or other types of RAN devices, as described herein), and/or other types of factors (e.g., city versus rural, high versus low density, etc.) that may indicate a characteristic or an attribute pertaining to the RAN device.

The network information in data store 200 may also include information reported by end devices 140, such as quality measurement information. For example, the quality measurement information may include a Reference Signal Receive Power (RSRP) value, a Received Signal Strength Indicator (RSSI), a Reference Signal Received Quality (RSRQ) value, or an analogous type of measurement, such as a signal-to-noise ratio (SNR), a signal-to-interference-plus-noise ratio (SINRs), or another type of channel condition value.

Offline training data generator 205 may apply a set of given constraints to a function to be optimized. Offline training data generator 205 may use data from data store 200 to create a training data set using offline constrained optimization. For example, a function L(C) may be a function of all customer attributes G (both given and computed) for customers (C).

Offline training data generator 205 may compute a change in a distribution of each customer attribute over a past time interval and predict distribution of each of the customer attributes in a next time interval. Based on the predicted distribution, offline training data generator 205 may assign weights to individual samples in the training time intervals. Offline training data generator 205 may then optimize the function to assign a numerical value to each of the customers based on the weighted samples, which becomes the training data. The training data may be stored as offline training data sets. The training data may be stored in data store 200 and may be used offline by modeling platform 210 to generate, tune, and validate updated models.

Modeling platform 210 may use machine learning, for example, to build a model using the training data set generated by offline training data generator 205. Thus, a defined model of for a particular constrained function may be generated and optimized based on historical data stemming from past customer events. For example, customer attributes such as age, longevity, churn rate may be correlated to a particular fee waiver. According to another implementation, modeling platform may apply machine learning to continuously improve robustness of the online constraint optimizing service by suggesting efficient network resource utilization.

Model repository 215 may include data models generated by modeling platform 210 for access by authorized users, such as customer service representatives using user devices 150. Models in model repository 215 may be available, for example, only to users with authorized accounts (e.g., accounts of customer service representatives).

Online prescriptive analytics module 220 may apply models from model repository 215 to generate results, such as availability of solutions for customer inquiries to generate a more efficient network utilization. Because online prescriptive analytics module 220 may be trained using the constrained optimization based training data, the online model (from model repository 215) is able to work with business constraints indirectly instead of requiring access to data for all the requesting users (e.g., current and future users). For example, a customer service representative may receive a customer service inquiry (e.g., via customer service platform 225) and may initiate online prescriptive analytics module 220 to retrieve an appropriate model from model repository 215. Customer attributes of the particular customer may be applied to the model in real time to provide a decision for the customer inquiry. For example, online prescriptive analytics module 220 may determine if granting a customer request for a fee waiver is an optimal solution for the network provider. As another example, online prescriptive analytics module 220 may provide recommendations for an optimal allocation to retain a customer during a bandwidth constraint.

Customer service platform 225 may provide a web-based interface for a customer service representative (e.g., using user device 150) to receive and manage customer inquiries. According to one implementation, customer service platform 225 may be used to identify topics or models from model repository 215 that may be applied by online prescriptive analytics 220.

Figure 3:
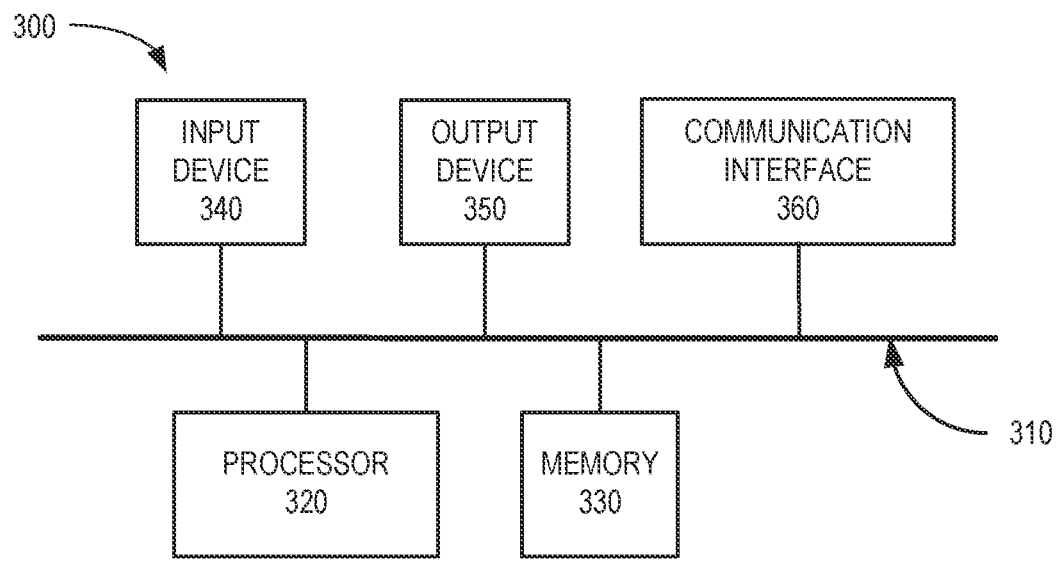
FIG. 3 is a diagram illustrating exemplary components of a device that may be included in a component of FIG. 1 and/or FIG. 2, according to an implementation described herein.

FIG. 3 is a diagram illustrating exemplary components of a device 300 that may correspond to one or more of the devices described herein. For example, device 300 may correspond to network device 110, RAN devices of access network 130, end device 140, user device 150, elements illustrated in FIG. 2, and other systems, as described herein. As shown in FIG. 3, device 300 may include a communication path 310, a processor 320, a memory 330, an input device 340, an output device 350, and a communication interface 360.

Communication path 310 may include a path that permits communication among the components of device 300. For example, communication path 310 may include a system bus, an address bus, a data bus, and/or a control bus. Communication path 310 may also include bus drivers, bus arbiters, bus interfaces, clocks, and so forth.

Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to implementing closed loop analytics feedback for a transport network. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
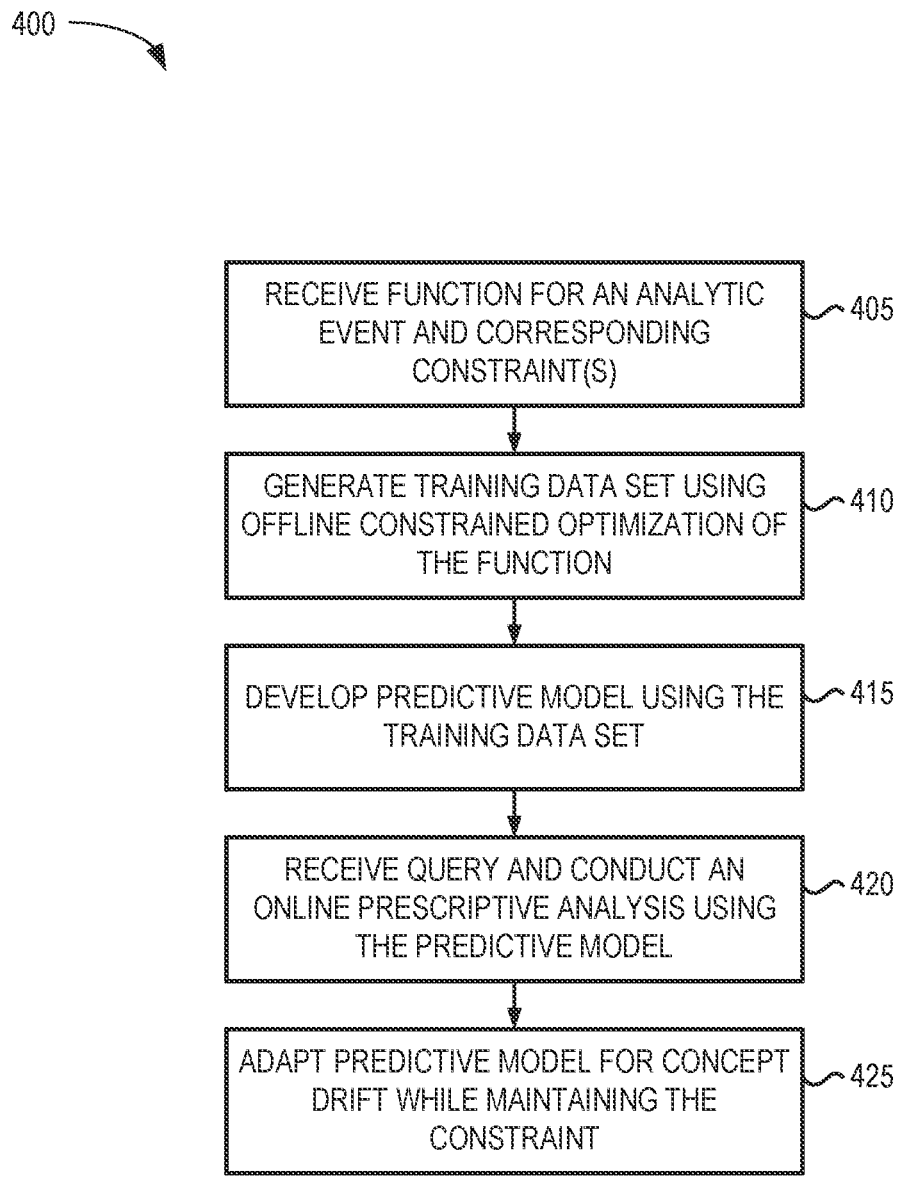
FIGS. 4 and 5 are flow diagrams illustrating an exemplary process for implementing the online constraint optimizing service for a telecommunications network, according to an implementation described herein.

FIG. 4 is a flow diagram illustrating an exemplary process 400 for implementing an online constraint optimizing service for a telecommunications network, according to an implementation described herein. In one implementation, process 400 may be implemented by one or more of network devices 110.

Referring to FIG. 4, process 400 may include receiving a function for an analytic event and a corresponding constraint (block 405). For example, network device 110 may receive user input for a function for an analytic event and a constraint. The analytic event may include, for example, an inquiry for responding to a customer request for a fee waiver, a budget constraint inquiry (e.g., request for a reduce fee), or contractual adjustment for a telecommunications services subscription. The function may include a summation (or a different application) of different customer attributes for a telecommunications network with given constraints, G. For example, the function may include a combination of given customer attributes (e.g., customer age, gender, geographic region, etc.) and computed customer attributes (e.g., churn propensity, customer tenure, lifetime subscription value, etc.). In one implementation, the function, $L(C)$, may be a function of all customer attributes (both given and computed) of all customers (C) that is to be optimized The function $L(C)$ may be of the form of sum of $N(c)$ for all c, where $N(c)$ is a numerical assignment to a customer, c. In one implementation, for example, the function may reflect an impact of a fee waiver, where $L(C)$ is be a summation of revenue(c)—waiver(c).

Process 400 may include generating a training data set using offline constrained optimization of the function (block 410). For example, offline training data generator 205 may retrieve data from data store 200. Offline training data generator 205 may use data from data store 200 to generate a training data set using offline constrained optimization as described further in connection with FIG. 5.

Figure 5:
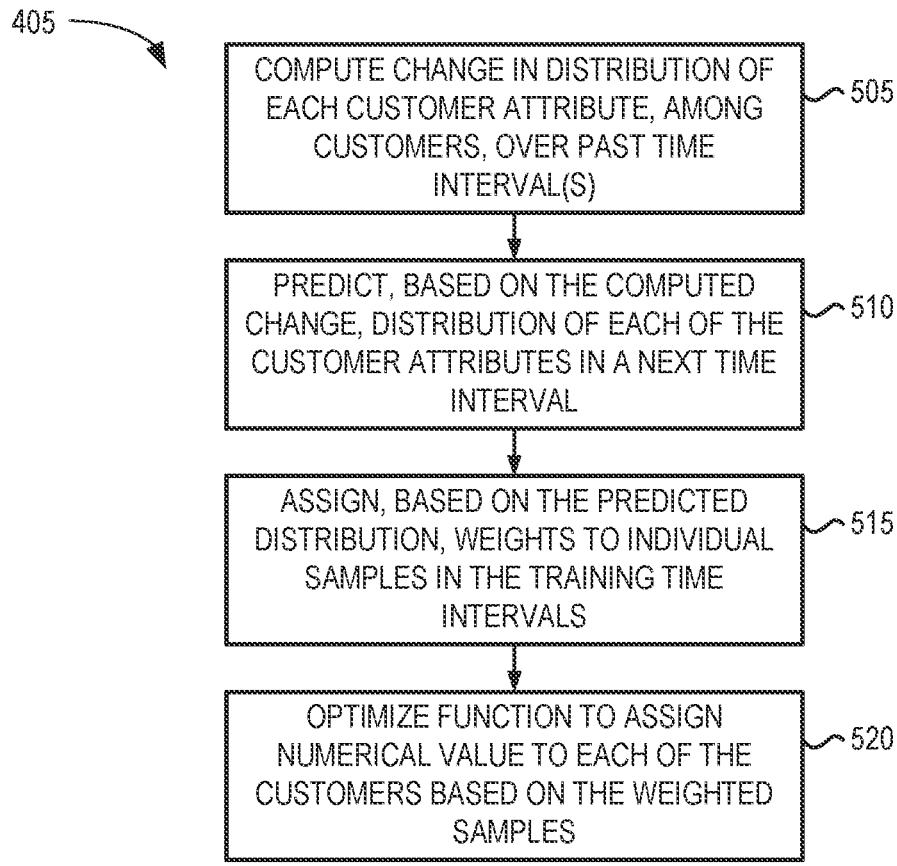

As shown in FIG. 5, process block 410 from FIG. 4 may include computing a change in distribution of each of the customer attributes, among customers, over one or more past time intervals (block 505); predicting, based on the computing, distribution of each of the customer attributes, among the customers, in a next time interval (block 510); assigning, based on the predicting, weights to individual samples in the one or more training time intervals (block 515); and optimizing the function to assign a numerical value to each of the customers based on the weighted samples (block 520). For example, assume each customer c in the group of customers C, has j given attributes (such as age and gender) and k computed attributes (such as churn propensity and lifelong value). Offline training data generator 205 may compute the change in distribution of each attribute j over a time interval to predict the distribution in the next time interval and assign sample weights according to the computed change. As an example, in time t−1, customers below age 25 might form 10% of C, and in time t it is predicted that customers below age 25 will form 20% of C. Offline training data generator 205 may weight those samples in the training interval with sample weight of 2. Similarly for each sample, c, offline training data generator 205 may compute sample weights across all attributes j, k and combine them with some function (e.g., an average). Offline training data generator 205 may merge the sample weight while satisfying the constraints G, or while optimizing the function L(C). Offline training data generator 205 may optimize the function to assign a numerical value to each customer. The assigned numerical values will form the training set for predicting the numerical values of customers in time t.

Returning to FIG. 4, process 400 may include developing a predictive model using the training data set (block 415). For example, modeling platform 210 may use the training data and apply machine learning to develop a model for predictive analysis. In one example, the model may provide a prediction for a customer considering a budget constraint when the customer requests a waiver on the charged fees or a reduction on the charged fees. The predictive model may be stored in model repository 215, for example.

Process 400 may further include receiving a query and conducting an online prescriptive analysis using the predictive model (block 420). For example, based on a service inquiry (e.g., received via customer service platform 225 or from another network function) that corresponds to a known analytic event (e.g., a customer accessing the network during a disruption requires bandwidth re-allocation), online prescriptive analytics module 220 may retrieve an appropriate model from model repository 215, collect customer attributes of the requesting customer, and apply the customer attributes to the model. In one implementation, the model may be utilized in real time to provide a decision for the customer inquiry. The resulting decision (e.g., to grant a particular amount of bandwidth during a constrained period) may be provided to the requesting network function, for example.

Process 400 may also include adapting the predictive model for concept drift while maintaining the constraint (block 425). For example, modeling platform 210 may observe accuracy of the predictive model over time. Modeling platform 210 monitor for changes in the relationships between input and output data in the optimized function over time. If before the elapse of the time t, a concept drift is observed in the customer behavior associated with a number of customers, the same behavior can be used to compute the sample weights of the customers in time t−1 and the model may be trained accordingly. According to one implementation, instead of replacing the sample weights in time interval t−1, modeling platform 210 can merge new sample weights with the sample weight of the interval t−1 to assure more robustness.

Figure 6:
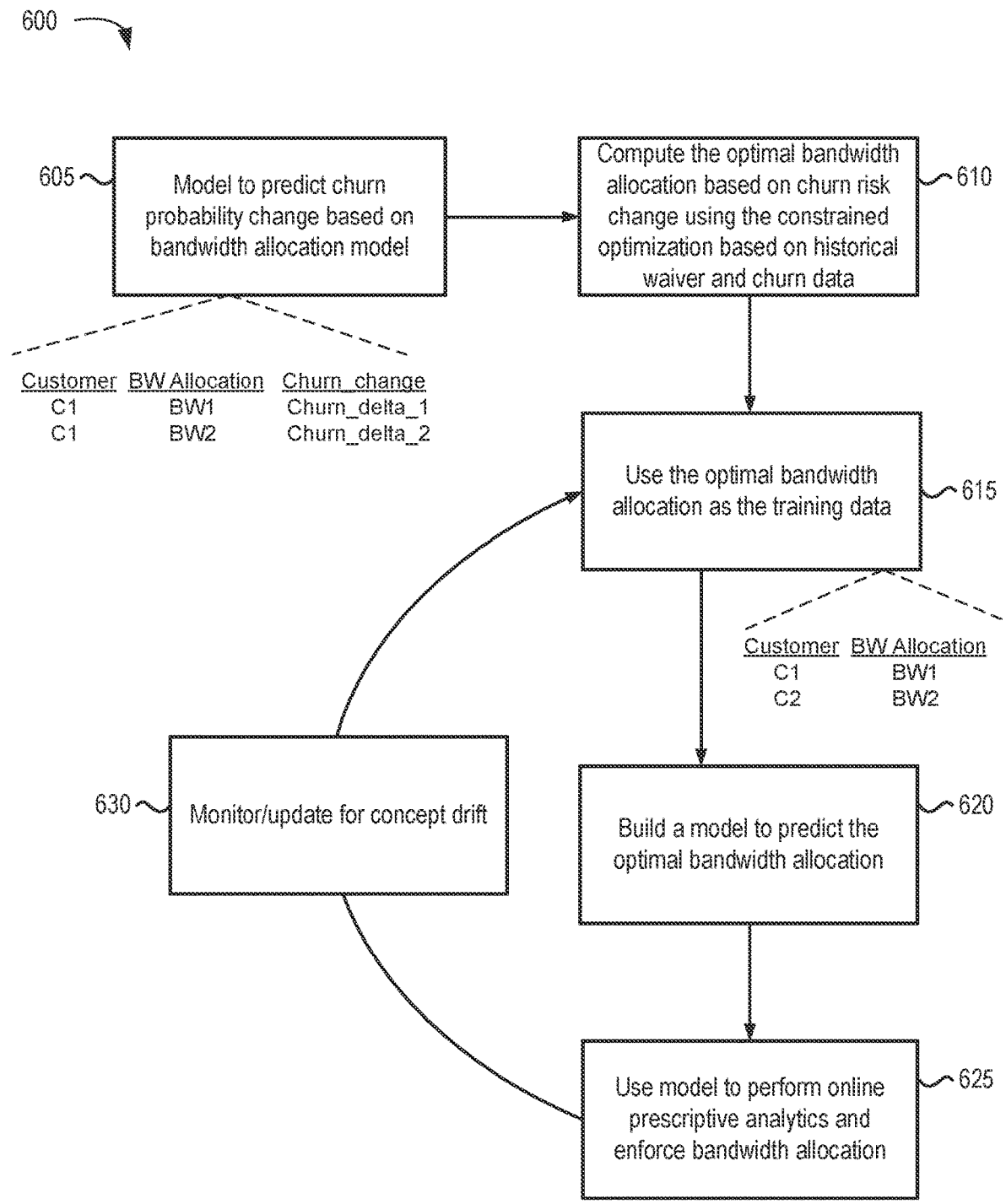
FIG. 6 is a diagram illustrating an exemplary use case of the online constraint optimizing service, according to an implementation.

FIG. 6 illustrates a particular use case 600 for the online constraint optimizing service. FIG. 6 describes a use case of an optimized bandwidth allocation for a user with a customer pool. Constrained optimization may be performed by one or more network functions (e.g., executed on network device 110) to estimate an optimal bandwidth allocation as per historical data. For example, use case 600 may be used to predict bandwidth allocation for individual users and/or wireless stations in case of network failure/environmental change. Network devices 110 may provide real-time bandwidth adjustments that are preferable to, for example, simply switching off non-emergency traffic in an affected area.

A network provider may have a fixed amount of available bandwidth (e.g., available through a particular wireless station or groups of wireless stations). Users (e.g., user of end devices 140) may have service plans with a contracted level of service that may provide an order of precedence to bandwidth resources. Users with the same level of precedence may be arranged based on business rules, such as lifetime value, churn probability, etc., or based on user demographics, such as how a user uses bandwidth. As shown at step 605, a function to predict bandwidth allocation for a user based on an allocation model and a set of constraints is provided. Definitions may include the following:

R=Total available bandwidth
MinN(c)=Minimum bandwidth allocated to user c
MaxN(c)=Maximum bandwidth allocated to user c
N(c)=Bandwidth allocated to user c
CXP[c, N(c)]=user rating for the network
$\Delta$CXP[c,N(c),MaxN(c)]=[CXP(c,MaxN(c))−CXP(c,N(c))]=Change in user c experience for lower bandwidth allocation
Q(c)=Quality of service expectation of user c, and
Churn(c)=Churn probability of user c.

The function may be configured to solve for N(c) to get minimal drop in user experience with an optimal utilization of network bandwidth, with the constraints as follows:

Constraints G(C, R)
MinN(c)<N(c)<MaxN(c)
Churn(ci)*$\Delta$CXP[$c_i$]<Churn($c_j$)*$\Delta$CXP[$c_i$], if Q($c_i$)>Q($c_j$)
L(C)=R−N(c), maximize L(C).

At step 610, a network function (e.g., offline training data generator 205) may compute the optimal bandwidth allocation for a user based on the constrained optimization of historical bandwidth usage, user experience, and churn data (e.g., obtained from data store 200). At step 615, the network function may store/use the calculated optimal bandwidth allocations as training data. At step 620, the network function (e.g., modeling platform 210) may build a regression model to predict the bandwidth allocation for a user or wireless station in case of a network event (e.g., local tower failure another event impacting network availability). For example, modeling platform 210 may build a multiclass classification model to predict the bandwidth allocation for users considering the optimal user bandwidth usage as the ground truth. In other implementations, different types of models may be used (e.g., multilabel, binary, etc.). The model may be stored in model repository 215, for example.

At step 625, in response to a network event or a service inquiry (e.g., submitted via customer service platform 225), the network function (e.g., online prescriptive analytics module 220) may retrieve the appropriate model from model repository 215 and apply network attributes (both given and computed) to the model to perform online prescriptive analytics that will identify optimal bandwidth allocations for users. The determined bandwidth allocation for the user may be implemented in real-time. Thus, from the given data, adjusted for the projected traffic on the network, and based on precedence of user's contracted service levels, the network function may proportionally adjust allocations to users based on the bandwidth allocation model. In this case, the projected distribution of the users will change in a particular region and for the same user pool, the values can be calibrated again by giving higher quality of service expectation (Q) for required user sets (e.g., emergency/first responders, etc.). Hence, these constraints based on the environment can also be added into a constraint set to determine bandwidth allocation beforehand, reducing response time to an environmental change.

At step 630, the network function (e.g., modeling platform 210) may monitor accuracy of the predictive model. For example, if concept drift is observed in the user behavior, the same behavior can be used to compute the sample weights of the users in time t−1 and the model may be trained accordingly.

Systems and methods described herein provide an online constraint optimizing service that evaluates customer requests and inquiries for telecommunications services in the context of a real-time constraint-based analysis. According to an implementation, a network device receives a function for an analytic event and a constraint. The function may include apply different customer attributes for a telecommunications network. The network device generates a training data set using offline constrained optimization of the function. The network device develops a predictive model for utilization of network resources in the telecommunications network using the training data set. The network device receives a customer request that corresponds to the analytic event addressed by the predictive model and conducts an online prescriptive analysis using the predictive model to provide an optimal recommendation for the customer request to effectively allocate the network resources. The network device may monitor the model recommendations and adapt the predictive model for concept drift while maintaining the constraint.

The systems and methods described herein perform offline constrained optimization-based training data generation. An online prescriptive analytics module may be trained using the constrained optimization-based training data; so the online model is able to work with business constraints indirectly instead of requiring access to data for all the requesting users. Thus, online optimization decisions can be made in real time when a request arrives.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 4-6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
receiving, by one or more network devices, a function for an analytic event and a constraint, wherein the function applies different user attributes for a telecommunications network;
generating, by the one or more network devices, a training data set, wherein the training data set is generated using offline constrained optimization of the function;
developing, by the one or more network devices, a predictive model for utilization of network resources in the telecommunications network using the training data set;
receiving, by the one or more network devices, a query for a user that corresponds to the analytic event;
conducting, by the one or more network devices, a real-time prescriptive analysis for the query using the predictive model; and
optimizing by one or more network devices, allocation of the network resources to the user based on the prescriptive analysis.

2. The method of claim 1, wherein generating the training data set includes:
computing a change in distribution of each of the user attributes, among users, over one or more past time intervals;
predicting, based on the computing, distribution of each of the user attributes, among the users, in a next time interval;
assigning, based on the predicting, weights to individual samples in the one or more training time intervals to form weighted samples; and
optimizing the function to assign a numerical value to each of the users based on the weighted samples.

3. The method of claim 1, wherein the function includes a combination of given user attributes and computed user attributes.

4. The method of claim 3, wherein the given user attributes include a user age and gender provided by the user, and wherein the computed user attributes include a churn propensity associated with a service and a lifetime subscription value associated with the service.

5. The method of claim 1, wherein developing the predictive model includes:
building a multiclass classification model to predict a centile for a new user.

6. The method of claim 1, further comprising:
receiving a user request that corresponds to the predictive model; and
obtaining user attributes, relating the user request, to use in the predictive model.

7. The method of claim 1, wherein the analytic event includes:
a bandwidth allocation for a user of a wireless network,
responding to a user request for a waiver or fee reduction,
a budget constraint inquiry, or
a contractual adjustment for a telecommunications services subscription.

8. The method of claim 1, further comprising:
adapting, by the one or more network devices, the predictive model for concept drift while maintaining the constraint.

9. The method of claim 8, wherein adapting the predictive model further incudes:
incorporating, by the one or more network devices, behavior changes of the users identified during a present time interval into the predictive model.

10. The method of claim 9, wherein the incorporating includes merging a first sample weight of a preceding time interval with a second sample weight of the present time interval.

11. One or more network devices, comprising:
a memory storing instructions; and
a processor configured to execute the instructions to:
receive a function for an analytic event and a constraint, wherein the function uses different user attributes for a telecommunications network,
generate a training data set, wherein the training data set is generated using offline constrained optimization of the function,
develop a predictive model for utilization of network resources in the telecommunications network using the training data set,
receive a query for a user that corresponds to the analytic event,
conduct a real-time prescriptive analysis for the query using the predictive model, and
optimize allocation of the network resources to the user based on the prescriptive analysis.

12. The one or more network devices of claim 11, wherein when generating the training data set, the processor is further configured to execute the instructions to:
compute a change in distribution of each of the user attributes, among users, over one or more past time intervals;
predict, based on the computing, distribution of each of the user attributes, among the users, in a next time interval;
assign, based on the predicting, weights to individual samples in the one or more training time intervals to form weighted samples; and
optimize the function to assign a numerical value to each of the users based on the weighted samples.

13. The one or more network devices of claim 11, wherein the function includes a combination of given user attributes and computed user attributes.

14. The one or more network devices of claim 11, wherein, when generating the training data, the processor is further configured to execute the instructions to:
incorporate behavior changes of the users identified during a present time interval into the predictive model.

15. The one or more network devices of claim 11, wherein the processor is further configured to:
receive a user request that corresponds to the predictive model, and
obtain user attributes, relating the user request, to use in the predictive model.

16. The one or more network devices of claim 11, wherein the analytic event includes:
a user request for a contractual adjustment for a telecommunications services subscription.

17. A non-transitory computer-readable medium containing instructions executable by at least one processor, the computer-readable medium comprising one or more instructions for:
receiving a function for an analytic event and a constraint, wherein the function includes a summation of different user attributes for a telecommunications network;
generating a training data set, wherein the training data set is generated using offline constrained optimization of the function;
developing a predictive model for utilization of network resources in the telecommunications network using the training data set;

receiving a query for a user that corresponds to the analytic event;

conducting an online prescriptive analysis for the query using the predictive model; and optimizing allocation of the network resources to the user based on the prescriptive analysis.

18. The non-transitory computer-readable medium of claim 17, wherein the one or more instructions for generating the training data set further comprise one or more instructions for:

computing a change in distribution of each of the user attributes, among users, over one or more past time intervals;

predicting, based on the computing, distribution of each of the user attributes, among the users, in a next time interval;

assigning, based on the predicting, weights to individual samples in the one or more training time intervals to form weighted samples; and optimizing the function to assign a numerical value to each of the users based on the weighted samples.

19. The non-transitory computer-readable medium of claim 17, wherein the function includes computed user attributes for churn propensity associated with a service and a lifetime subscription value associated with the service.

20. The non-transitory computer-readable medium of claim 17, further comprising one or more instructions for:

receiving a user request that corresponds to the predictive model, and obtaining user attributes, relating the user request, to use in the predictive model.

\* \* \* \* \*